Patented Oct. 12, 1954

2,691,661

UNITED STATES PATENT OFFICE 2,691,661

MANUFACTURE OF ORGANOMERCAPTO-SUBSTITUTED QUINONES

Jacobus Jan Tjepkema, Amsterdam, Netherlands, assignor to Shell Development Company, Emeryville, Calif., a corporation of Delaware No Drawing. Application April 15, 1952,
Serial No. 282,476

Claims priority, application Netherlands
August 15, 1951

7 Claims. (Cl. 260—396)

This invention relates to improvement in the manufacture of organomercapto - substituted quinones, and it relates more particularly to an improved method for the manufacture of hydrocarbonmercapto-substituted 1,4-quinones by the interaction of the corresponding halo-substituted 1,4-quinones with mercaptans.

The organomercapto-quinones, to the manufacture of which the present invention relates, comprise the 1,4-quinones wherein at least one nuclear hydrogen atom is substituted by the group —SR in which R is a member of the group consisting of any monovalent organic radical, aliphatic, cycloaliphatic, aromatic, heterocyclic, including hydrocarbon radicals, such as, alkyl, cycloalkyl, aryl, aralkyl, alkaryl, and unsaturated hydrocarbon groups, and wherein the —SR group, or groups, are attached to the quinone nucleus by direct linkage of the sulfur atom of the —SR group to a nuclear carbon atom in the quinone nucleus. Comprised within the above-defined class of organomercapto-substituted quinones are the hydrocarbonmercapto-substituted 1,4-quinones represented by the following empirical formula:

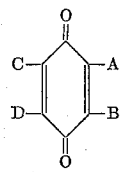

(I)

wherein at least one of the substituents A and B is —SR, the substituent A or B when not —SR being hydrogen, and wherein the substituents C and D each represent the same or a different member of the group consisting of —SR and hydrocarbon groups. In the foregoing definition of the hydrocarbonmercapto-substituted 1,4-quinones represented by the Formula I R of the substituent —SR group represents any monovalent hydrocarbon group, such as, alkyl, cycloalkyl, aryl, aralkyl, alkaryl, and unsaturated hydrocarbon radicals. When C and D in the compounds defined by the foregoing Formula I are each hydrocarbon they may be joined to form a closed ring structure.

Comprised within the above-defined hydrocarbonmercapto-substituted 1,4-quinones are the alkylmercapto-, arylmercapto-, aralkylmercapto- and alkarylmercapto-substituted benzoquinones wherein a substituent hydrocarbonmercapto group is directly attached through the sulfur atom to at least one of the nuclear carbon atoms in the 2, 3, 5 and 6 positions of the 1,4-benzoquinone nucleus, as well as the alkylmercapto-, arylmercapto-, aralkylmercapto- and alkarylmercapto-substituted 1,4-naphthoquinones wherein the hydrocarbonmercapto substituent goup is directly attached through the sulfur atom to at least one of the nuclear carbon atoms in the 2 and 3 positions of the 1,4-naphthoquinone (alpha-naphthoquinone).

Methods have been disclosed heretofore for the production of hydrocarbonmercapto-substituted quinones using chloro-substituted quinones as a starting material. Methods disclosed heretofore, however, generally are beset with difficulties militating against their use in practical scale operations. The yields obtainable therein are generally exceedingly low when using contact times commensurate with commercial scale operating conditions; resolution of the reaction mixtures thereby obtained without substantial product loss is often difficult. These disadvantages it is found are often inherent to a greater or lesser degree when effecting the reaction in aqueous medium.

It has now been found that the organomercapto-substituted quinones are obtained from halo-substituted quinones and mercaptans efficiently and with high yields at contact times commensurate with practical scale operation by reacting said halo-substituted quinones with the mercaptan at a temperature below about 25° C. in the presence of a hydrocarbon solvent.

Halo-substituted quinones employed in the production of the organomercapto - substituted quinones in accordance with the invention comprise the halo-substituted 1,4-quinones wherein at least one of the nuclear hydrogen atoms is replaced by a halogen atom. The process of the invention lends itself particularly to the use of the chloro-substituted 1,4-quinones as charge. The chloro-substituted 1,4-quinones preferably employed as charge are represented by the empirical formula:

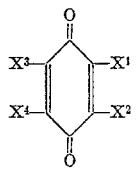

(II)

wherein at least one of the substituent groups $X^1$ and $X^2$ is chlorine, the substituent $X^1$ and $X^2$ when not chlorine being hydrogen, and wherein $X^3$ and $X^4$ are each chlorine or a hydrocarbon radical. When $X^3$ and $X^4$ are both hydrocarbon they may be joined together to form a closed ring structure. Examples of such suitable chloro-substituted 1,4-quinones are the chlorinated benzoquinones, such as, 2,3,5,6-tetrachlorobenzo-quinone-1,4, the chlorinated naphthoquinones, such as, 2,3-dichloronaphthoquinone-1,4, Diels-Alder adducts of chloranil with a diene hydrocarbon such as cyclopentadiene. The chloroquinone-1,4 employed as reactant may be substituted on the ring with minor substituent groups which do not interfere with the reaction under the conditions of execution of the reaction. Such substituent groups comprise, for example, lower alkyl groups, such as, methyl, ethyl, propyl, etc.

Mercaptans reacted with the halo quinones in accordance with the invention comprise broadly compounds, preferably essentially aliphatic compounds, containing a thiol group. Suitable mercaptans comprise the hydrocarbon mercaptans, such as, alkyl mercaptan, aryl mercaptan, alkaryl mercaptan and aralkyl mercaptan. The mercaptans employed as charge to the process may be obtained from any suitable source. Examples of suitable mercaptans comprise, for example, ethyl mercaptan, butyl mercaptan, amyl mercaptan, dodecyl mercaptan, benzyl mercaptan and phenylethyl mercaptan.

The process of the invention lends itself with particular advantage to the use as mercaptan charge, the aliphatic mercaptans having from about 3 to about 12 carbon atoms. The mercaptans charged to the process of the invention need not necessarily be in substantially pure state. The charge may comprise mixtures of two or more mercaptans. A suitable mercaptan charge to the process comprises the mercaptan-containing mixtures obtained in the refining of mercaptan-containing petroleum fractions. An example of such mixed mercaptans obtained in the refining of petroleum hydrocarbons are the mixed aliphatic mercaptans boiling, for example, up to about 75° C., and wherein the mathematical average of number of carbon atoms per molecul is about 2.6.

In carrying out the process of the invention reaction of the mercaptans with the chloro-substituted quinones is preferably brought about by the use of the mercaptans as the alkali metal salt, for example, as the salts of sodium, potassium, lithium, etc.

Reaction of the chloro-substituted quinone with the organomercaptan, or the alkali metal salt thereof, is effected at a temperature below about 25° C. Particularly preferred is the temperature range of from about 10° C. to about 20° C. Lower temperatures may, however, be employed within the scope of the invention. The use of higher temperatures is, however, generally detrimental to efficient operation. Heating the reaction mixture to distillation or refluxing temperatures will in many cases result in the absence of any determinable amount of the desired mercapto-substituted quinones in the resulting mixture.

Essential to the obtaining of the objects of the invention is the execution of the reaction in the presence of a hydrocarbon solvent. Suitable hydrocarbon solvents comprise, for example, the paraffinic hydrocarbons of open chain and cyclic structure, and the aromatic hydrocarbons, which are liquid under the execution of the reaction, or mixtures thereof. Such suitable solvents comprise, pentanes, hexanes, heptanes, octanes, undecane, of open and closed chain structure, benzene, toluene, xylenes, ethylbenzene, isopropyl benzene, etc. Particularly preferred is the use of a solvent of aromatic character such as one consisting essentially or predominantly of an aromatic hydrocarbon.

In carrying out the process of the invention the chloro-1,4-quinone and the mercaptan, or the alkali metal salt thereof, are reacted with another in any suitable type of reactor enabling the maintenance of the desired temperature conditions. Either one or both of the components may be dispersed in a portion of the hydrocarbon solvent and separately introduced into the reaction zone. In a preferred method of carrying out the process the chlorinated quinone is dissolved in at least a part of the hydrocarbon solvent and brought to the reaction temperature whereupon the mercaptide is added thereto in the form of a solution or a suspension. As a medium for the introduction of the mercaptide into the reaction zone a vehicle other than the hydrocarbon solvent may be employed in an amount preferably not substantially exceeding that necessary to effect the efficient introduction of the mercaptide into the reaction zone. Such suitable vehicles comprise, for example, hydrocarbon alcohols, particularly the diphatic alcohols such as, methyl-ethyl-, propyl-, isobutylamyl alcohol, etc. Maintenance of the desired reaction temperature is generally facilitated by the controlled introduction of the mercaptide reactant into the reaction zone.

Under the above-defined conditions the halo substituent, for example, the chloro substituent, of the halo-quinone charge is replaced by a hydrocarbon thiol group, —SR, corresponding to the hydrocarbon thiol group of the mercaptan, or mercaptide, employed as charge to the reaction. Thus, by reacting 2,3,5,6-tetra chlorobenzoquinone-1,4 with ethyl mercaptan, or an alkali metal salt of ethyl mercaptan, there is obtained a reaction product comprising 2,3,5,6-tetraethylthiobenzoquinone-1,4. In the production of polyhydrocarbonmercapto - substituted quinones in accordance with the invention using mixed mercaptans as the mercaptan reactant the hydrocarbonthiol substituents of the resulting product will generally not all be the same and may differ from one another. It is apparent that by selection of a specific chloro-quinone-1,4 and a specific mercaptan, or mercaptide, as reactants a specific hydrocarbonmercapto-substituted quinone-1,4 is obtainable. The process of the invention thus brings within the realm of practicability the efficient production of specific organomercapto 1,4-quinones with excellent yields at relatively short contact times as evidenced by the examples set forth hereinbelow.

Separation of the desired organomercapto-substituted 1,4-quinone from the resulting crude reaction mixture may comprise one or more of such steps as stratafication, decantation, filtration, evaporation, distillation, solvent extraction, etc. During evaporation the passage of inert gas, such as nitrogen, over or through the mixture may be resorted to.

The products obtained in accordance with the invention vary from crystalline to normally liquid oily products depending upon the specific materials employed as initial reactants. In their crude form they are generally relatively dark in color. The crystalline products are readily purified by recrystallization and the oily products may be purified by such simple expedients as washing with water, solvent extraction, and the like. The products of the invention are of particular value as fungicides. They may be employed as such without purification. A property of the products of the invention rendering them particularly applicable for use as fungicides is their appreciable solubility in oils thereby enabling their efficient use as oil-soluble fungicidal sprays on plants.

EXAMPLE I 0.015 mole of 2,3,5,6-tetrachlorobenzoquinone-1,4 was suspended in 100 cc. of benzene. While stirring and maintaining the mixture at 10°–15° C., 0.066 mole (10% excess) of potassium ethyl mercaptide dissolved in 35 cc. of ethanol was added during 30–40 minutes through a dropping funnel. Stirring was continued for another 2 hours during which time the temperature was allowed to rise to room temperature.

The precipitate, consisting of potassium chloride and unreacted tetrachlorobenzoquinone, was removed by filtration. Solvent was evaporated from the filtrate by bubbling nitrogen rapidly therethrough while heating it on a steam bath. A solid consisting essentially of 2,3,5,6-tetraethylthiobenzoquinone-1,4 was obtained as the residue. It was recrystallized from ethanol.

EXAMPLE II

In a series of separate operations a number of 2,3,5,6-tetraalkylthiobenzoquinones-1,4 (runs 1–9 in following Table I) were prepared by the reaction of 2,3,5,6-tetrachlorobenzoquinone-1,4 with a potassium alkyl mercaptide. Similarly, in two separate operations (runs 10–11) two 2,3,5,6-tetraarylthiobenzoquinones were prepared by reacting 2,3,5,6-tetrachlorobenzoquinone-1,4 with a potassium aryl mercaptide. A mixture of 2,3,5,6-tetraalkylthiobenzoquinones-1,4 (run 12) was also prepared by reacting 2,3,5,6-tetraalkylthiobenzoquinone-1,4 with a mixture of potassium alkyl mercaptides prepared from commercial grade mercaptans obtained in the refining of petroleum fractions and consisting essentially of ethyl-, propyl-, and isopropyl mercaptans. Conditions employed were substantially identical to those set forth in the foregoing Example I. The hydrocarbon constituent of the potassium mercaptide employed in each operation is the same as the hydrocarbon radical —R set forth for each run in second column of the following Table I. Identity and yield of the product obtained in each run is set forth in the following Table I.

*Table I*

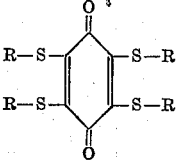

| Run No. | Significance of R in the Compound | Product Recrystallized from— | Melting point, °C. | Yield in percent based on 2,3,5,6-tetrachlorobenzoquinone charged |
|---|---|---|---|---|
| 1 | $C_2H_5$- | ethanol | 87.5 | 66 |
| 2 | $(CH_3)_2CH$- | ...do | 100 | 51 |
| 3 | straight $C_4H_9$- | ...do | 23 | 61 |
| 4 | $(CH_3)_3C$- | ...do | 141–3 | 72 |
| 5 | $C_3H_7(CH_3)CH$- | | oily liquid | 60 |
| 6 | $(CH_3)_2CHCH_2CH_2$- | | ...do | 89 |
| 7 | straight $C_8H_{17}$- | | ...do | 65 |
| 8 | straight $C_{10}H_{21}$- | acetone | 45 | 77 |
| 9 | straight $C_{12}H_{25}$- | ...do | 48–9 | 63 |
| 10 | $C_6H_5CH_2$- | benzene | 134 | 75 |
| 11 | $CH_3.C_6H_4$- | ...do | 200 | 66 |
| 12 | $C_2H_5$-/$C_3H_7$-/$(CH_3)_2CH$- mixture. | | oily liquid | 94 |

EXAMPLE III 0.03 mole of 2,3-dichloronaphthoquinone-1,4 was dispersed in 150 cc. of benzene. While stirring, and maintaining the solution at 10°–15° C. by cooling 0.066 mole (10% excess) of potassium methyl mercaptide dissolved in 85 ml. of ethanol was added during 30–40 minutes through a dropping funnel. Stirring was continued for another 3 hours during which time the temperature was allowed to rise to room temperature. A resulting precipitate consisting essentially of potassium chloride was removed by filtration. Solvent was evaporated from the filtrate by rapidly bubbling nitrogen therethrough while heating it on a steam bath. The solid obtained as residue was identified as crude 2,3 - dimethylthionapthoquinone-1,4. It was recrystallized from methanol.

EXAMPLE IV

A number of other 2,3-dialkylthionaphthoquinones-1,4 (runs 13–23 in the following Table II) were prepared by reacting 2,3-dichloronaphthoquinone-1,4 with a potassium alkyl mercaptide. Similarly two 2,3-diarylthionaphthoquinones (runs 24–25) were prepared by reacting 2,3-dichlorothionaphthoquinone-1,4 with a potassium aryl mercaptide. In a separate operation (run 26) a mixture of 2,3-dialkylthionaphthoquinones-1,4 was prepared by reacting 2,3-dichloronaphthoquinone-1,4 with a mixture of potassium alkyl mercaptides prepared from a commercial grade of mixed alkyl mercaptans obtained by refining petroleum hydrocarbon fractions and consisting essentially of ethyl-, propyl- and isopropyl mercaptans. Other conditions employed were substantially identical to those employed in the operation of Example II.

The hydrocarbon constituent of the potassium mercaptide employed in each operation is the same as the hydrocarbon radical —R set forth for each run in the second column of the following Table II. Identity and yield of the product obtained in each separate run is set forth in the following Table II.

Table II

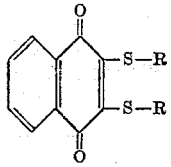

| Run No. | Significance of R in the Compound | Product Recrystallized from— | Melting point, °C. | Yield in percent based on 2,3-dichloronaphthoquinone charged |
|---|---|---|---|---|
| 13 | CH₃– | methanol | 111 | 60 |
| 14 | C₂H₅– | ethanol | 82–3 | 66 |
| 15 | (CH₃)₂CH– | | oily liquid | 58 |
| 16 | straight C₄H₉ | ethanol | 37 | 66.5 |
| 17 | (CH₃)₃C– | acetone | 105 | 69 |
| 18 | C₃H₇(CH₃)CH– | | oily liquid | 61 |
| 19 | (CH₃)₂CHCH₂– | | | |
| 20 | CH₂ | | oily liquid | 63 |
| 21 | straight C₈H₁₇– | acetone | 58 | 80 |
| 22 | straight C₁₀H₂₁– | do | 67 | 87 |
| 23 | straight C₁₂H₂₅– | do | 74–5 | 63 |
| 24 | C₆H₅CH₂– | benzene | 183 | 57 |
| 25 | CH₃·C₆H₄– | ethanol | 168–9 | 84 |
| 26 | C₂H₅–/C₃H₇–/(CH₃)₂CH– mixture. | | oily liquid | 80 |

The invention claimed is:

1. In a process for the production of reaction mixtures comprising hydrocarbonmercapto-substituted 1,4-quinones by the reaction of halo-substituted 1,4-quinone with hydrocarbonmercaptan, the improvement which comprises effecting said reaction in a normally liquid aromatic hydrocarbon medium consisting essentially of benzene at a temperature below about 25° C.

2. In the process for the production of reaction mixtures comprising hydrocarbonthio-substituted-1,4-quinones by the reaction of a halo-substituted 1,4-quinone with an alkali metal salt of a hydrocarbon-mercaptan, the improvement which comprises effecting said reaction in an aromatic hydrocarbon solvent consisting essentially of a benzene hydrocarbon at a temperature below about 25° C.

3. In a process for the production of reaction mixtures comprising alkylthio-substituted 1,4-quinones by the reaction of chloro-substituted-1,4-quinone with an alkali metal alkylmercaptide, the improvement which comprises effecting said reaction in the presence of an aromatic hydrocarbon solvent consisting essentially of benzene hydrocarbon at a temperature below about 25° C.

4. In a process for the production of reaction mixtures comprising alkylthio-substituted 1,4-quinones by the reaction of chloro-substituted 1,4-quinones with a potassium alkyl mercaptide, the improvement which comprises effecting said reaction in a benzene solvent at a temperature of from about 10° C. to about 25° C.

5. In a process for the production of 2,3,5,6-tetralkylthiobenzoquinone-1,4 wherein 2,3,5,6-tetrachlorobenzoquinone-1,4 is reacted with an alkali metal alkyl mercaptide, the improvement which comprises effecting said reaction in the presence of a benzene hydrocarbon at a temperature below about 25° C.

6. In a process for the production of 2,3,5,6-tetraethylthiobenzoquinone-1,4 wherein 2,3,5,6-tetrachlorobenzoquinone-1,4 is reacted with potassium ethylmercaptide the improvement which comprises effecting said reaction in an aromatic hydrocarbon solvent consisting essentially of a benzene hydrocarbon at a temperature of from about 10° C. to about 25° C.

7. In a process for the production of 2,3-dialkylthionaphthoquinone-1,4 by reacting 2,3-dichloronaphthoquinone-1,4 with an alkali metal alkyl mercaptide, the improvement which comprises effecting said reaction in a benzene solvent at a temperature below about 25° C.

References Cited in the file of this patent

Dimroth et al.: Liebig's Ann., vol. 545 (1940), pp. 126–130.